(12) United States Patent
Cunningham

(10) Patent No.: US 6,233,526 B1
(45) Date of Patent: May 15, 2001

(54) VIBRATING CONDUIT PARAMETER SENSORS AND METHODS OF OPERATION THEREFOR UTILIZING SPATIAL INTEGRATION

(75) Inventor: Timothy J. Cunningham, Boulder, CO (US)

(73) Assignee: Micro Motion, Inc., Boulder, CO (US)

(*) Notice: Subject to any disclaimer, the term of this patent is extended or adjusted under 35 U.S.C. 154(b) by 0 days.

(21) Appl. No.: 09/116,845

(22) Filed: Jul. 16, 1998

(51) Int. Cl.$^7$ .............................. G01F 1/00; G01F 1/84; G06F 19/00
(52) U.S. Cl. ..................... 702/45; 702/47; 73/861.356; 73/861.357
(58) Field of Search .................................. 702/45, 46, 47, 702/48, 50, 54, 100, 104, 189; 73/861.355, 861.356, 861.357

(56) References Cited

U.S. PATENT DOCUMENTS

| 4,777,833 | * | 10/1988 | Carpenter | 73/861.38 |
|---|---|---|---|---|
| 5,009,109 | | 4/1991 | Kalotay et al. | 73/861.38 |
| 5,029,535 | * | 7/1991 | Krigmont et al. | 110/345 |
| 5,301,557 | | 4/1994 | Cage et al. | 73/861.38 |
| 5,394,876 | * | 3/1995 | Ma | 600/455 |
| 5,734,112 | | 3/1998 | Bose et al. | 73/861.56 |

FOREIGN PATENT DOCUMENTS

| 0 701 107 A2 | 3/1996 | (EP) | G01F/1/00 |
|---|---|---|---|
| 0791807A2 | 8/1997 | (EP) . | |
| WO89/04463 | 5/1989 | (WO) . | |

(List continued on next page.)

OTHER PUBLICATIONS

Rieder, Drahm; "A New Type of Single Straight Tube Coriolis Mass Flowmeter", Flomenko '96, presented at the 8$^{th}$ International Conference (1996), pp. 250–255.

Stuart J. Shelley, Investigation of Discrete Modal Filters For Structural Dynamic Applications (1991) (Unpublished Ph.D. Dissertation, University of Cincinnati).

Cunningham; "Zero Shifts Due to Non-Proportional Damping", Micro-Motion Report #10233, Part of IMAC XV, Feb. 1997, Session 8j, Structural Damping.

(List continued on next page.)

Primary Examiner—Marc S. Hoff
Assistant Examiner—Manuel L. Barbee
(74) Attorney, Agent, or Firm—Chrisman, Bynum & Johnson, P.C.

(57) ABSTRACT

A process parameter sensor for a material processing system includes a conduit configured to contain material from the material processing system. A plurality of motion transducers is operative to produce a plurality of motion signals representing motion at a number of locations on the conduit. An overdetermined process parameter estimator is responsive to the plurality of motion transducers and configured to receive the plurality of motion signals. The overdetermined process parameter estimator is operative to resolve conduit motion into motion attributable to each of a predetermined number of forces and to estimate a process parameter associated with a material in the conduit according to the resolved motion, wherein the number of locations exceeds the number of forces such that the plurality of motion signals provides an overdetermined information set for resolution of conduit motion into motion attributable to the predetermined number of forces. According to one aspect, a process parameter is estimated from a spatially averaged motion signal using, for example, a conventional Coriolis measuring circuit. According to another aspect, a plurality of motion signals is produced representing motion at a number of locations exceeding a predetermined number of real or complex modes such that the plurality of motion signals represent an overdetermined information source for resolution of motion of the conduit into motion in each of the modes. An estimate of modal motion attributable to a Coriolis force may be generated from the plurality of motion signals, and an estimate of a process parameter may be estimated from the estimate of modal motion.

17 Claims, 4 Drawing Sheets

FOREIGN PATENT DOCUMENTS

| | | | |
|---|---|---|---|
| WO 92/14123 | 8/1992 | (WO) | G01F/1/84 |
| WO 95/16897 | 6/1995 | (WO) | G01F/1/84 |
| WO 95/29385 | 11/1995 | (WO) | G01F/1/84 |
| WO96/02812 | 2/1996 | (WO) . | |
| WO97/40348 | 10/1997 | (WO) . | |
| WO 98/07009 | 2/1998 | (WO) | G01F/1/84 |

OTHER PUBLICATIONS

Bosse et al.; "Application of Modal Filtering Techinques to Vibration Control of Precision Truss", AD–VOL. 45/MID–VOL. 54, Adaptive Structures and Composite Material, Analysis and Application ASME 1994, pp. 281–285.

Cunningham; "Zero Shifts in Coriolis Sensors Due to Imbalance", Procedings of AIAA/ASME/ASCE/AHS/ASC $35^{th}$ Structures, Structural Dynamics and Materials Conference, Apr. 18–20, 1994, AIAA Paper 94–1621 (A94–2411a).

Stack, Garnett, Pawlas; "A Finite Element for the Vibration Analysis of Fluid–Conveying Timoshenko Beam", AIAA Paper 93–1552, pp. 1–10 (1993).

Timothy J. Cunningham, Modal Analysis and Zero Stability of Coriolis Mass Flowmeters (1993) (M. of Science Thesis, Colorado State University (Fort Collins)).

* cited by examiner

VIBRATING CONDUIT PARAMETER SENSORS AND METHODS OF OPERATION THEREFOR UTILIZING SPATIAL INTEGRATION

BACKBROUND OF THE INVENTION

1. Field of the Invention

This invention pertains to process parameter sensors and methods of operation therefor, and more particularly, to vibrating conduit parameter sensors and methods of operation therefor.

2. Statement of the Problem

Coriolis effect mass flowmeters are commonly used to measure mass flow and other information for materials flowing through a conduit. Exemplary Coriolis flowmeters are disclosed in U.S. Pat. No. 4,109,524 of Aug. 29, 1978, U.S. Pat. No. 4,491,025 of Jan. 1, 1985, and Pat. No. Re. 31,450 of Feb. 11, 1982, all to J. E. Smith et al. These flowmeters typically include one or more conduits having a straight or a curved configuration. Each conduit may be viewed as having a set of vibration modes, including, for example, simple bending, torsional, radial and coupled modes. In a typical mass flow measurement application, each conduit is driven to oscillate at resonance in one of its natural modes as a material flows through the conduit. The vibration modes of the vibrating, material-filled system are effected by the combined mass and stiffness characteristics of the conduits and the characteristics of the material flowing within the conduits.

A typical component of a Coriolis flowmeter is the drive or excitation system. The drive system operates to apply a periodic physical force to the conduit that causes the conduit to oscillate. The drive system typically includes at least one actuator mounted to the conduit(s) of the flowmeter. The actuator typically comprises one of many well known electromechanical devices, such as a voice coil device having a magnet mounted to a first conduit and a wire coil mounted to a second conduit, in an opposing relationship to the magnet. A drive circuit continuously applies a periodic, e.g., a sinusoidal or square wave, drive signal to the actuator coil. The periodic drive signal causes the actuator to drive the two conduits in an opposing periodic pattern that is thereafter maintained.

When there is effectively "zero" flow through a driven flowmeter conduit, points along the conduit tend to oscillate with approximately the same phase or a "zero-flow" phase with respect to the driver, depending on the mode of the driven vibration. As material begins to flow from an inlet of the flowmeter, through the conduit and out of an outlet of the flowmeter, Coriolis forces arising from the material flow tend to induce phase shifts between spatially separate points along the conduit. Generally, as material flows through the conduit, the phase on the inlet side of the conduit lags the driver, while the phase on the outlet side of the conduit leads the driver. The phase shift induced between two locations on the conduit is approximately proportional to the mass flow rate of material through the conduit.

To measure mass flow rate, conventional Coriolis flowmeters typically measure phase at two transducers, e.g., coil-type velocity transducers, located near respective ends of the conduit, symmetrically placed with respect to a centrally positioned driver. However, manufacturing-induced errors in transducer placement as well as other structural variations and nonlinearities in the conduit structure may cause measurement inaccuracies.

SUMMARY OF THE INVENTION

In light of the foregoing, it is an object of the present invention to provide parameter sensors and methods of operation therefor which can provide more accurate techniques for measuring process parameters such as mass flow rate, totalized mass flow rate, viscosity and the like in a vibrating conduit parameter sensor.

This and other objects, features and advantages are provided according to the present invention by vibrating conduit parameter sensors and methods of operation therefor in which a spatially integrated estimate of a process parameter associated with a material in the conduit, e.g., mass flow rate, totalized mass flow, viscosity and the like, is determined. A plurality of forces associated with an excited sensor conduit is identified. Motion signals are received representing motion at a number of locations on the sensor conduit that exceeds the number of the identified forces such that the plurality of motion signals provide an overdetermined information source for resolution of conduit motion into motion attributable to the plurality of forces. A potentially more accurate estimate of a process parameter associated with the moving material may thereby be generated.

In particular, according to the present invention, a process parameter sensor for a material processing system includes a conduit configured to contain material from the material processing system. A plurality of motion transducers is operative to produce a plurality of motion signals representing motion at a number of locations on the conduit. An overdetermined process parameter estimator is responsive to the plurality of motion transducers and configured to receive the plurality of motion signals. The overdetermined process parameter estimator is operative to resolve the conduit motion into motion attributable to each of a predetermined number of forces and to estimate a process parameter associated with a material in the conduit according to the resolved motion, wherein the number of locations exceeds the number of forces such that the plurality of motion signals provides an overdetermined information set for resolution of the conduit motion into motion attributable to the predetermined number of forces. The overdetermined process parameter estimator may include means for generating an estimate of motion attributable to a Coriolis force, and means, responsive to the means for generating an estimate of motion, for generating an estimate of a process parameter such as mass flow from the estimate of motion.

According to an aspect of the present invention, a group of motion signals is combined to produce a spatially averaged motion signal. A process parameter is estimated from the spatially averaged motion signal using, for example, a conventional Coriolis measuring circuit.

According to another aspect of the present invention, a number of real modes are identified. A plurality of motion signals is produced, the plurality of motion signals representing motion at a number of locations exceeding the number of real modes such that the plurality of motion signals represent an overdetermined information source for resolution of motion of the conduit into motion in the plurality of real modes. An estimate of modal motion attributable to a Coriolis force may be generated from the plurality of motion signals, and an estimate of a process parameter may be estimated from the estimate of modal motion.

According to yet another aspect of the present invention, a complex mode is identified. A plurality of motion signals is produced, the plurality of motion signals representing motion at a number of locations exceeding two such that the plurality of motion signals provides an overdetermined information source for resolution of the conduit to motion in the complex mode. An estimate of a complex modal transformation may be generated from the plurality of motion signals, and an estimate of a process parameter may be generated from the estimate of the complex modal transformation. Improved estimates of process parameters such as mass flow rate may thereby be provided.

DETAILED DESCRIPTION OF EMBODIMENTS

Figure 1:
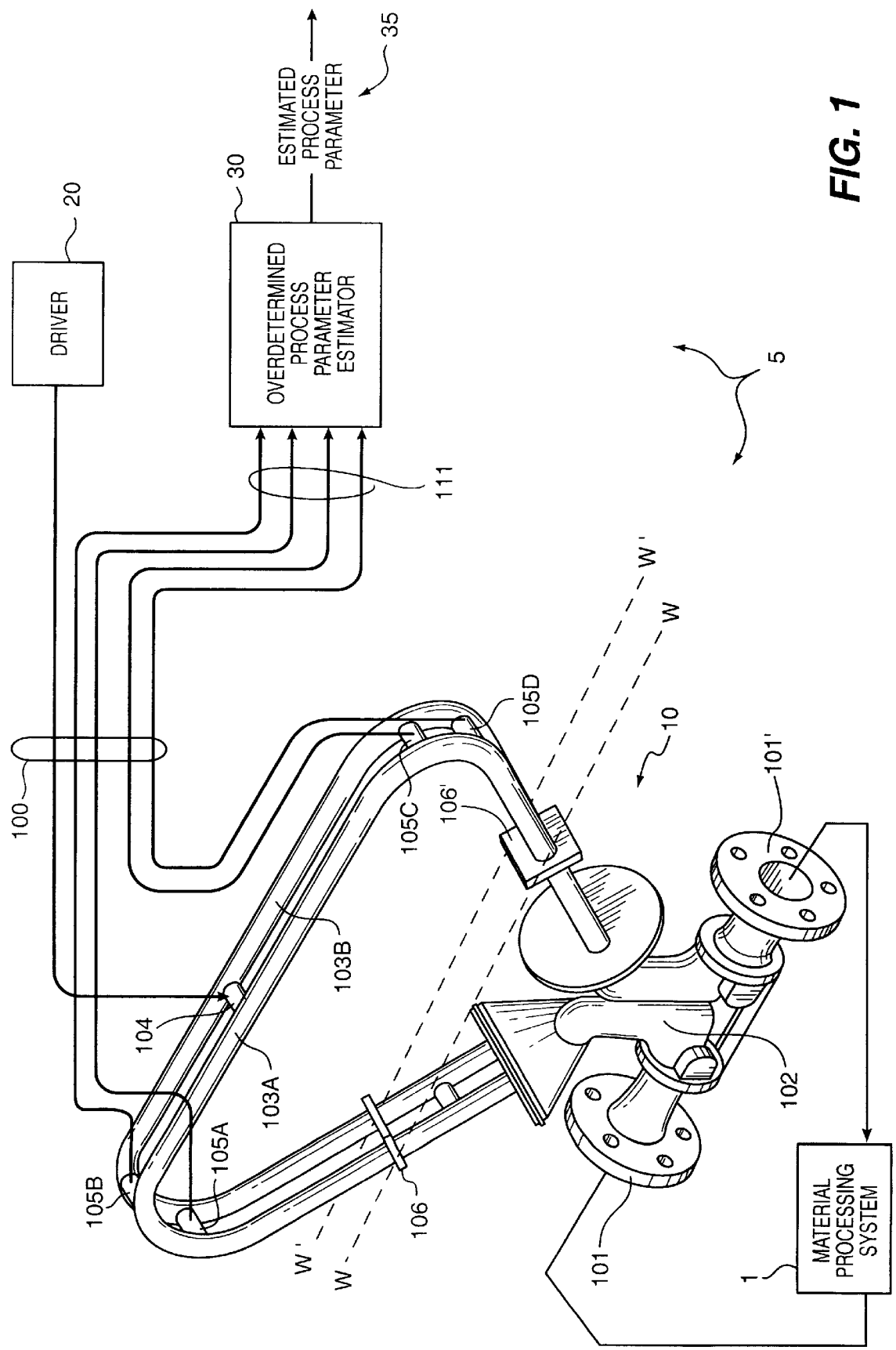
FIG. 1 illustrates an embodiment of a vibrating conduit parameter sensor according to the present invention.

The present invention now will be described more fully hereinafter with reference to the accompanying drawings, in which embodiments of the invention are shown. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

The following discussion refers to Coriolis flowmeters in which a process parameter of a material processing system, typically mass flow rate, is estimated for a material, e.g., a fluid, flowing through a vibrating conduit configured to contain a material which passes through the vibrating conduit as part of the material processing system. Those skilled in the art will appreciate, however, that the present invention is also applicable to vibrating conduit process parameter sensors other than in-line sensors. For example, in addition to in-line type mass flowmeters, the present invention is applicable to sampling-type vibrating-tube densitometers which include a conduit configured to contain a sample of a material extracted from a material processing system.

As used herein, a "material processing system" may comprise a wide variety of fluid or other material handling systems in which a material is transported, contained, reacted or otherwise processed. These systems may include, but are not limited to, chemical and food processing systems, fluid transport systems such as petroleum pipelines, hydraulic systems and the like.

FIG. 1 illustrates an exemplary embodiment of a parameter sensor 5 according to the present invention. The sensor 5 includes a conduit assembly 10. The conduit assembly 10 includes an inlet flange 101, an outlet flange 101', a manifold 102 and first and second conduits 103A, 103B. Brace bars 106, 106' connect the conduits 103A, 103B. Connected to the conduits 103A, 103B is an actuator 104 that is operative to vibrate the conduits 103A, 103B responsive to a driver 20. A plurality of motion transducers 105A–D is operative to produce motion signals representing motion of the conduits 103A, 103B at a plurality of locations thereon, e.g., signals representing displacement, velocity or acceleration. The motion transducers 105A–D may include a variety of devices, such as coil-type velocity transducers, optical or ultrasonic motion sensors, accelerometers, inertial rate sensors and the like. Leads 100 are connected to the actuator 104 and the motion transducers 105A–D.

When the conduit assembly 10 is inserted into a material processing system 1, material flowing in the material processing system 1 enters the conduit assembly 10 through the inlet flange 101. The material then flows through the manifold 102, where it is directed into the conduits 103A, 103B. After leaving the conduits 103A, 103B, the material flows back into the manifold 102 and exits the meter assembly 10 through the outlet flange 101'. As the material flows through the conduits 103A, 103B, it gives rise to Coriolis forces that perturb the conduits 103A, 103B.

The conduits 103A, 103B are typically driven by the actuator 104 in opposite directions about their respective bending axes W—W and W'—W', inducing what is commonly referred to as a first out of phase bending mode in the conduit assembly 10. The actuator 104 may comprise any one of many well-known devices, such as linear actuator including a magnet mounted to the first conduit 103A and an opposing coil mounted to the second conduit 103B. An alternating current induced by a drive signal provided by a driver 20 via a drive lead 110 passes through the coil, generating mechanical force that vibrates the conduits 103A, 103B. Although the parameter sensor 5 illustrated in FIG. 1 is shown as including an integral actuator 104, those skilled in the art will appreciate that vibration of the conduits 103A, 103B according to the present invention may be achieved by other techniques, such as by an excitation generated external to the conduit assembly 10 and conveyed to the conduit assembly 10, for example, via one of the flanges 101, 101'.

An overdetermined process parameter estimator 30 is responsive the plurality of motion transducers 105A–D, receiving motion signals on leads 111 representing motion of the conduits 103A, 103B as a material flows therethrough. The overdetermined process parameter estimator 30 processes the received motion signals to resolve motion of the conduit into motion attributable to a predetermined plurality of forces acting upon the conduits 103A, 103B including, for example, a Coriolis force imparted by a material passing through the conduits 103A, 103B and a force imparted by the actuator 104. The overdetermined process parameter estimator 30 is also operative to estimate a process parameter 35 associated with the material passing through the conduit, such as mass flow rate, totalized mass flow and the like, based on the resolved motion.

In a related United States patent application entitled "Improved Mass Flow Measurement Methods, Apparatus and Computer Program Products Utilizing Complex Modal Estimation," by Cunningham, assigned to the assignee of the present application, filed concurrently herewith and incorporated by reference herein in its entirety as if the text is physically present, methods, apparatus and computer program products are described which utilize complex modal transformation estimates to generate estimates of mass flow. According to the above-referenced techniques, sensor conduit motion is resolved to motion attributable to Coriolis force and motion attributable to an aggregate of other forces. In particular, Coriolis force is resolved by determining the complexity introduced into motion of a sensor conduit by mass flow through the conduit. A mass flow estimate may be generated by estimating a complex modal transformation that is related to mass flow.

Other measurement techniques may be viewed as employing similar force resolution techniques. For example, measurement techniques which resolve sensor conduit motion into motion in a plurality of real normal modes, i.e., motion of single degree of freedom (SDOF) systems, can be viewed as resolving conduit motion into respective motions responsive to forces in respective ones of the SDOF systems. The resolved motion in the SDOF systems can be used to generate measurements of mass flow rate, totalized mass flow, viscosity, and the like as described in a United States patent application entitled "Vibrating Conduit Parameter Sensors, Operating Methods and Computer Program Products Utilizing Real Normal Modal Decomposition", assigned to the assignee of the present application, filed concurrently herewith and incorporated by reference herein in its entirety as if the text is physically present. For example, resolved motion in a so-called twist mode of a Coriolis flowmeter having a u-shaped conduit can be assumed to be substantially attributable to Coriolis force produced by a moving material, and therefore, an estimate of mass flow can be generated from an estimate of motion in the twist mode.

According to the present invention, the process parameter estimator 30 is overdetermined, providing a mechanism for producing more accurate estimates of process parameters through spatial integration. As noted above, the overdetermined process parameter estimator is operative to resolve motion of the conduit into motion attributable to a predetermined number of forces. As used herein, "overdetermined" means that the process parameter estimator is operative to generate an estimate of a process parameter from an overdetermined information source, i.e., a source providing additional information beyond the minimum amount of information needed to resolve motion into motion attributable to the predetermined number of forces. According to the present invention, motion signals are provided to the overdetermined process parameter estimator that represent motion at a number of spatially diverse locations on the sensor conduit that is greater than the number of forces to be resolved, providing a spatially overdetermined source of information for the estimation process. The process parameter estimator thus produces a process parameter estimate that is spatially integrated.

The following discussion illustrates use of spatially overdetermined data sets to generate process parameter estimates using complex modal estimation techniques. It will be understood that spatial integration according to the present invention may be employed with a variety of measurement techniques other than those utilizing complex modal estimation. For example, the spatial integration techniques described with reference to complex modal estimation are also generally applicable to measurement techniques using real modal estimation. As also described herein, spatial integration can be used to combine information from spatially diverse transducers in a vibrating conduit parameter sensor, forming spatially averaged motion signals that can be processed using, for example, conventional phase difference type Coriolis calculations to provide improved measurements of process parameters such as mass flow rate, totalized mass flow, viscosity, and the like.

Determination of Mass Flow Using Complex Modal Estimation

A vibrating conduit of a parameter sensor such as a Coriolis flowmeter can be modeled as a system operating in a state of forced response. The forced response may be modeled as a superposition of a plurality of real normal modal responses. According to such a model, $$\{x\}(t) = [\Phi]\{|\eta|\cos(\omega_d t - \text{ang}(\eta))\} \tag{1}$$

$$\{x\} = [\Phi]\{\eta\},$$
$$\{\eta\} = [\Phi]^{-1}\{x\},$$
$$\{x\} = [H]\{F\},$$

and $$\{\eta\} = [\Phi]^{-1}[H]\{F\}, \tag{2}$$

where $\{\eta\}$ is a modal response vector, $\{F\}$ is a forcing function vector, $[H]$ is a frequency response function (FRF) matrix and $\Phi^{-1}$ is an inverse of a mode shape matrix $\Phi$. As can be seen from Equation (1), each term of the vector $\{x\}$ has a phase associated therewith. With zero flow through the conduit, if the force vector $\{F\}$ and the system characteristics embodied in the FRF matrix $[H]$ are known, measuring the phase at any one point on the conduit generally will yield the correct phase at any other point on the conduit.

Flowing fluid in a conduit may be represented as Coriolis forces which introduce complexity in a modal model of a conduit assembly. The Coriolis forces can be modeled using terms in the matrix associated with the velocity term in the linear differential equations describing the motion of the sensor conduit. When these Coriolis force terms are included in the eigenvalue representation of the conduit, the eigenvectors, i.e., the mode shapes, become complex. In detail, the linear differential equations of motions for the conduit become:

$$[M]\{\ddot{x}\} + [C]\{\dot{x}\} + [K]\{x\} = \{F\}, \tag{3}$$

where $[M]$ is a mass matrix, $[K]$ is a stiffness matrix, $\{F\}$ is an applied force vector, and $[C]$ is a matrix of Coriolis forces acting on the velocity term. Including the Coriolis matrix $[C]$ introduces complexity to the eigenvalue problem, i.e., results in complex eigenvectors.

Motion of a conduit with fluid flowing therethrough can be modeled as a scaled complex eigenvector. A complex eigenvector has two independent components at each degree of freedom. These components may include real and imaginary components or, alternatively, magnitude and phase components. According to this model, the motion of the conduit can be described by a free response, i.e., the drive force can be neglected in the description of the motion. The motion of a discrete set of points $\{x\}$ on the conduit can be described by:

$$\{x\}(t) = \alpha\{|\phi_d|\cos(\omega_d t - \text{ang}(\phi_d))\}, \tag{4}$$

where $\{\phi\}_d$ is a complex eigenvector associated with the drive mode, $\omega_d$ is a natural frequency associated with the drive mode, and the scalar $\alpha$ scales the magnitude of the eigenvector to match the amplitude of operation.

It can be assumed that $\alpha\{|\phi|_d\}$, the magnitude of the complex eigenvector $\{\phi\}_d$, is controlled by the drive circuit that drives the transducer to a given amplitude. As $\text{ang}(\phi_d)$, the complexity of the eigenvector, is unknown, information about motion at two locations can be used to determine the Coriolis forces. Referring to Equation (2), the complex modal response $\{\eta\}$ involves the system characteristics, represented by the FRF matrix $[H]$, and the applied force vector $\{F\}$. It may be assumed that the applied force vector $\{F\}$ is known. However, the system characteristics, embodied in the FRF matrix $[H]$, are a function of the mass flow rate and thus are unknown. Additional information, e.g., phase at a point other than the driver, allows determination of the mass flow rate.

In sum, knowledge of complex motion at more than two locations provides sufficient information to resolve motion of the conduit into motion attributable to Coriolis forces and motion attributable to other forces. An approach to measuring mass flow thus might include, for example, precisely controlling amplitude at one location, e.g., the driver location, such that the amplitude or phase of another location can provide sufficient information for a mass flow calculation. Alternatively, amplitude measured simultaneously at two separate locations, each amplitude measurement being normalized to a maximum amplitude at the location, can provide sufficient information for a mass flow measurement.

The complexity of a mode may be viewed as a rotation of an eigenvector in the complex plane. Knowing the imaginary part of the eigenvector at any two locations can provide information on the mode shape complexity, with the imaginary rotation being related to the mass flow rate. To estimate mass flow, for example, a meter is calibrated such that the rotation, i.e., a complex eigenvector, is known at a known mass flow. An unknown mass flow determining a corresponding complex vector and assuming that this vector corresponds to a complex modal transformation of the calibrated complex eigenvector. The transformation may be estimated from the calibrated complex eigenvector and the measurement vector using, for example, a curve fitting technique. The estimated transformation may then be used to estimate the unknown mass flow from the known mass flow.

A generalized linear regression technique may be used to determine mass flow from complex modal measurements. For example, an n×1 element vector $\{Y_e\}$ may be constructed at a known mass flow rate; $\{Y_e\}$ could include, for example, phase measurements at a plurality of locations on a sensor conduit. With material flowing through the conduit at an unknown mass flow rate, another n×1 element vector $\{X\}$ may be constructed from complex measurements at the plurality of locations. As described above, complex values may be generated for $\{Y_e\}$ and $\{X\}$ using measurements other than phase measurements.

In performing a linear regression, a transformation is found such that:

$$\{Y_e\} = a\{X\} + b, \tag{5}$$

where a and b are constants representing slope and offset, respectively. Manipulating Equation (5):

$$[Y_e] = \begin{bmatrix} x_1 & 1 \\ x_2 & 1 \\ \vdots & \vdots \\ x_n & 1 \end{bmatrix} \begin{bmatrix} a \\ b \end{bmatrix}^T = [Z]\{c\}, \tag{6}$$

where [Z] is an augmented matrix constructed from $\{X\}$ and $\{c\}$ is a vector having a and b as respective first and second elements. Equation (6) is in a form that allows computation of $\{c\}$.

According to the present invention, the number of locations for which motion information is available, e.g., the number of transducer locations, exceeds the number of forces for which motion of the conduit is to be resolved, and thus [Z] represents an overdetermined system, i.e., [Z] has more rows than columns. In such an overdetermined case, Equation (6) can be solved by premultiplying both sides by the transpose of [Z]:

$$[Z]^T\{Y_e\} = ([Z]^T[Z])\{c\}. \tag{7}$$

$[Z]^T[Z]$ is a square matrix, which for a physically well-posed problem has an inverse. Premultiplying both sides of Equation (7) by the inverse of $[Z]^T[Z]$ and solving for $\{c\}$:

$$\{c\} = ([Z]^T[Z])^{-1}[Z]^T\{Y_e\}. \tag{8}$$

The result $\{c\}$ represents a best fit of the vector $\{X\}$ to the complex eigenvector $\{Y_e\}$ according to a least squares criteria. The first element of $\{c\}$, the slope a, represents a scaling factor for a scaled rotation of $\{X\}$ to fit $\{Y_e\}$. For example, if $\{X\}$ and $\{Y_e\}$ are constructed from phase measurements, the mass flow rate $k_{unknown}$ corresponding to $\{X\}$ may be estimated from the known mass flow rate $k_{known}$ by:

$$k_{unknown} = \frac{k_{known}}{a}. \tag{9}$$

Overdetermined Complex Modal Sensor

Figure 2:
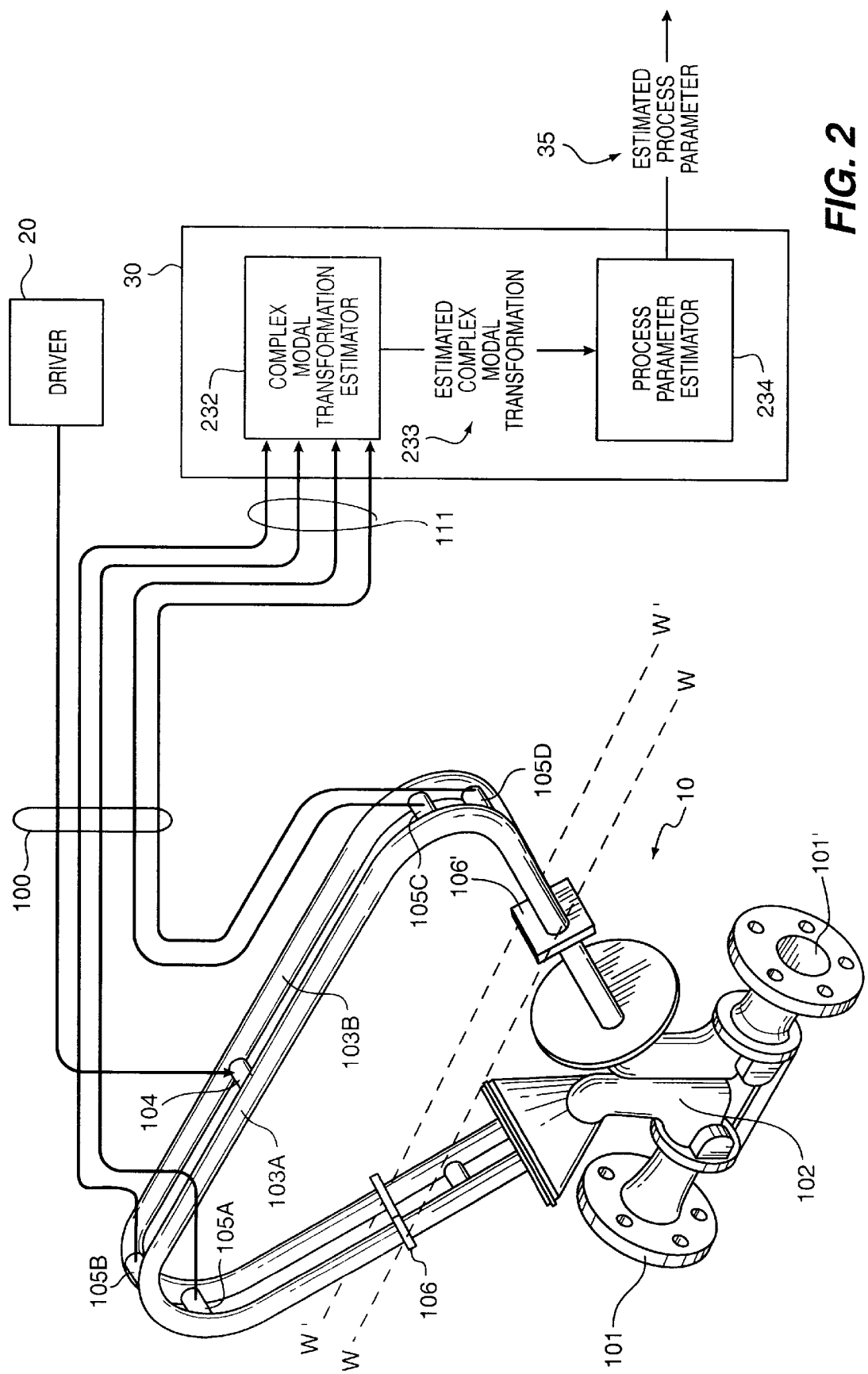
FIGS. 2 and 3 illustrate embodiments of a vibrating conduit parameter sensor utilizing complex modal estimation according to an aspect of the present invention.

FIG. 2 illustrates an embodiment of a parameter sensor 5 that employs complex modal estimation according to the present invention. Conduits 103A, 103B of a conduit assembly 10 are excited by one or more actuators 104. A plurality of motion transducers 105A–D produce a plurality of motion signals on a plurality of lines 111 representing motion at more than two locations on the conduits 103A, 103B. An overdetermined process parameter estimator 30 includes a complex modal transformation estimator 232 that is responsive to the plurality of motion transducers 105A–D, receiving the plurality of motion signals and estimating a complex modal transformation 233 therefrom. The estimated complex modal transformation 233 resolves motion of the conduit into motion attributable to Coriolis force and motion attributable to an aggregate of other forces by determining the complexity introduced into the motion of the conduits 103A, 103B by a Coriolis force, as described above. A process parameter estimator 234 is responsive to the complex modal transformation estimator 232, generating an estimate 35 of a process parameter, e.g., mass flow rate, totalized mass flow rate, viscosity, and the like, associated with a material passing through the conduits 103A, 103B from the estimated complex modal transformation 233. Because the number of locations for which motion information is provided exceeds the number of forces for which motion 13 resolved, the process parameter estimate 35 is spatially integrated.

Figure 3:
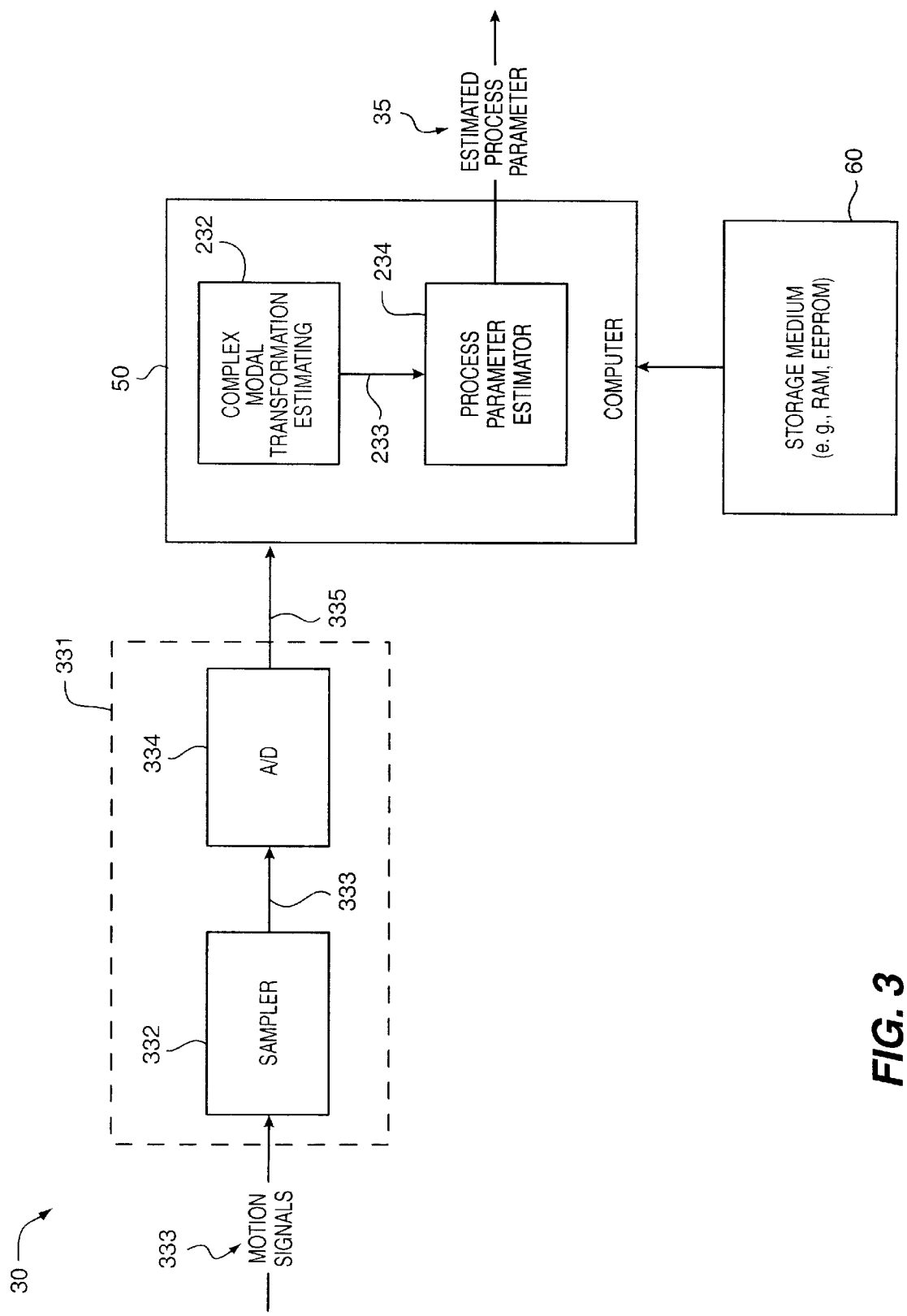

FIG. 3 illustrates an exemplary embodiment of overdetermined process parameter estimator 30. As illustrated, the overdetermined process parameter estimator 30 includes a sampler 332, for example, a sample-and-hold or similar circuit, and an analog-to-digital converter (A/D) 334. The sampler 332 and the A/D 334 provide means 331 for receiving motion transducer motion signals 333, sampling the motion signals 333 and producing samples 333 therefrom which are converted to digital signal values 335 by the analog-to-digital converter (A/D) 334. Detailed operations of the illustrated sampler 332 and A/D 334 may be performed by a number of circuits known to those skilled in the art, and need not be discussed in greater detail herein. Those skilled in the art will appreciate that the receiving means 331 illustrated in FIG. 3 may be implemented in a number of ways, including additional pre-sampling anti-alias filtering, post-sampling filtering and the like. It will also be understood that, in general, the receiving means 331 illustrated in FIG. 3 may be implemented using special purpose hardware, firmware or software running on special or general-purpose data processing devices, or combinations thereof.

Portions of the complex modal transformation estimator 232 may be embodied in a computer 50, e.g., a microprocessor, microcontroller, digital signal processor (DSP) or the like. For example, the computer 50 may comprise a pipelined DSP especially suited for linear algebraic computations, such as one of the DSPs of the TMS320C4X family of DSPs sold by Texas Instruments, Inc. Configured with appropriate program code, e.g., software and/or firmware and data stored, for example, in a storage medium 60 such as a random access memory (RAM), electrically erasable programmable read-only memory (EEPROM), magnetic disk or the like, the computer 50 provides complex modal transformation estimator 232 and a complex modal transformation 233 from the digital values 335.

The process parameter estimator 234 may also be implemented in the computer 50. Embodied as, for example, software or firmware running on the computer 50, the process parameter estimator 234 computes an estimate 35 of a process parameter, e.g., computes an unknown mass flow rate from a known mass flow according to the computed estimated complex modal transformation 233 produced by the complex modal transformation estimator 232. Detailed discussion of apparatus, methods and program products for performing these operations are discussed in the aforementioned patent application "Improved Mass Flow Measurement Methods, Apparatus and Computer Program Products Utilizing Complex Modal Estimation."

The spatial integration techniques described above with respect to complex modal estimation are similarly applicable to process parameter estimation techniques which employ real modal estimation. Analogous to the above-described resolution of conduit motion into real and complex components, motion of a sensor conduit can be resolved into a plurality of real normal modes, e.g., multiple bend modes, twist modes and the like, representing motion of the conduit as motion of a plurality of single degree of freedom (SDOF) systems subject to respective forcing functions. Process parameter estimates can be generated from the resolved motions in each of the modes in a manner similar to that described above for complex modal estimation. Motion in the SDOF systems may then be combined in a weighted combination, for example, to identify Coriolis force imparted by material moving in a sensor conduit, thus enabling estimation of mass flow.

Overdetermined Estimator Using Conventional Coriolis Measurement Techniques

Figure 4:
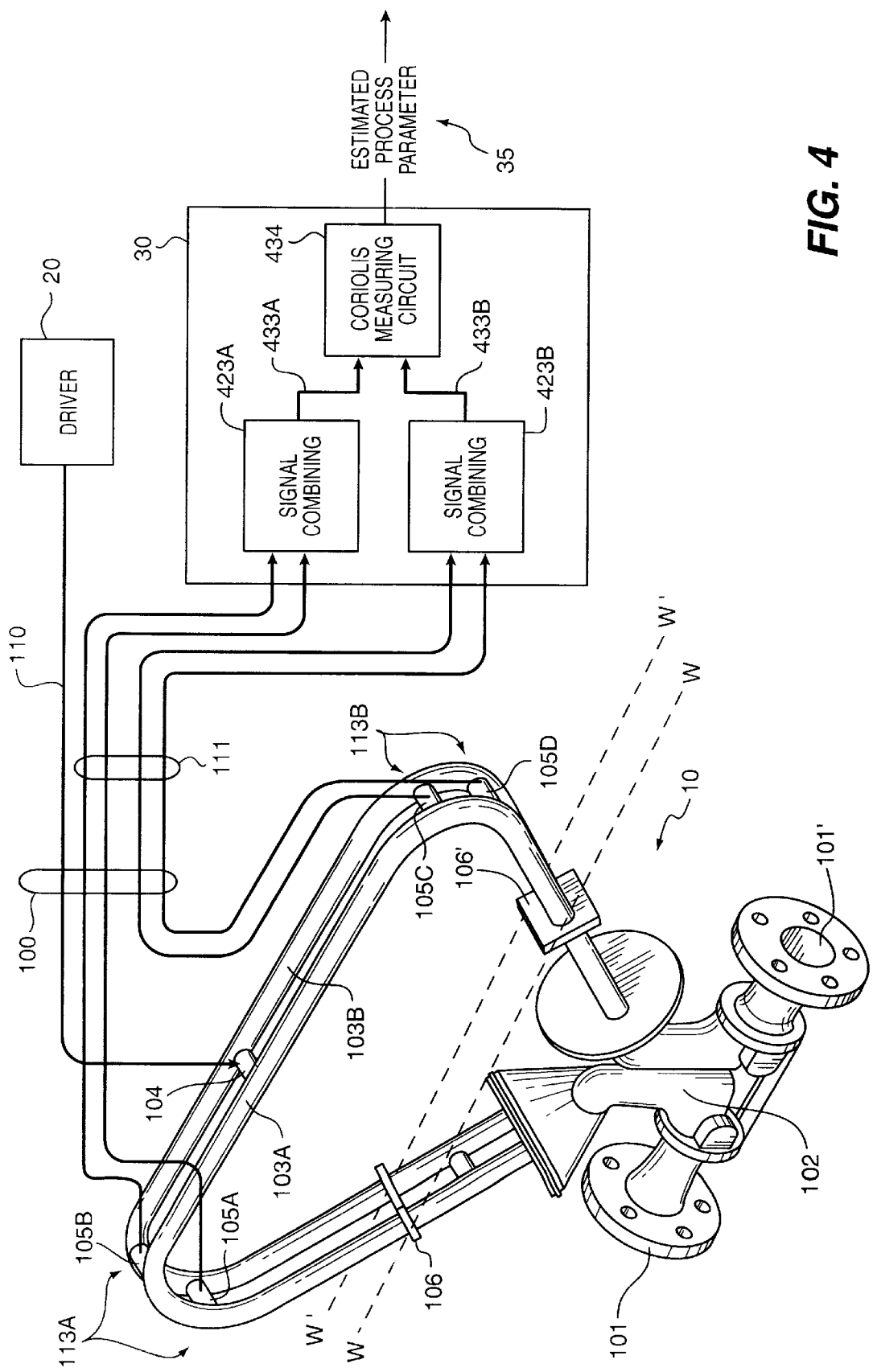
FIG. 4 illustrates another embodiment of a vibrating conduit parameter sensor according to the present invention.

According to another aspect of the present invention, the spatial integration concepts described above may also be combined with conventional Coriolis measurement techniques. An exemplary embodiment of a parameter sensor 5 according to the present invention is illustrated in FIG. 4. The parameter sensor 5 includes a plurality of motion transducers 105A–105D that produce motion signals representing motion at an overdetermined plurality of locations on the conduits 103A, 103B. In the illustrated embodiment, respective groups 113A, 113B of motion transducers are clustered about respective locations on the u-shaped conduits 103A, 103B.

The overdetermined process parameter estimator 30 includes multiple signal combining means 423A, 423B. Output signals produced by a group of transducers 113A, 113B are fed to a signal combining means 423A, 423A, where the signals are combined to produce a spatially averaged motion signal 433A, 433B. Means 434 are provided for generating an estimate 35 of a process parameter from the spatially averaged motion signals 433A, 433B, such as a conventional Coriolis measuring circuit as described in U.S. Pat. No. RE31,450 to Smith, U.S. Pat. No. 4,879,911 to Zolock, and U.S. Pat. No. 5,231,884 to Zolock.

It will be appreciated that the signal combining means 423A, 423B and the process parameter estimate generating means 434 may in general be implemented using special purpose hardware, software or firmware running on general or special purpose computing devices, or combinations thereof. For example, the signal combining means 423A, 423B may comprise any one of a number of analog combining circuits that are operative to produce an output signal that represents a weighted combination of input signals, such as resistor networks, weighted summing amplifiers, and the like. The operations of these circuits are well known to those skilled in the art and need not be discussed in detail herein. The signal combining means and the process parameter estimate generating means may alternatively be implemented in a digital domain, with the combination of motion signals and the generation of a process parameter estimate, e.g., phase difference calculation, occurring in a computing device such as a microprocessor, digital signal processor (DSP) or the like. Those skilled in the art will also appreciate that spatial integration for process parameter measurements can be implemented in ways other than the clustered fashion illustrated in FIG. 4. For example, a number of transducers could be placed about the sensor conduits 103A, 103B and output signals combined in a general weighted signal combiner or equalizer to produce one or more signals which can be used to perform Coriolis measurements.

The drawings and specification of the present application disclose embodiments of the invention. Although specific terms are employed, they are used in a generic and descriptive sense only and not for purposes of limitation. It is expected that persons skilled in the art can and will make, use or sell alternative embodiments that are within the scope of the following claims either literally or under the Doctrine of Equivalents.

That which is claimed is:

1. A process parameter sensor for a material processing system, the sensor comprising:

a conduit configured to contain material from the material processing system;

a plurality of motion transducers operative to produce a plurality of motion signals representing motion at a number of locations on the conduit wherein the number of locations exceeds a number of forces to be measured such that the plurality of motion signals provides an overdetermined information set for resolution of conduit motion to motion attributable to a predetermined number of forces; and an overdetermined process parameter estimator that receives the plurality of motion signals, resolves conduit motion into motion attributable to each of the predetermined number of forces by determining a complex modal transformation of a calibrated complex eigenvector from said plurality of motion signals wherein said calibrated complex eigenvector is a known rotation of a complex eigenvector associated with a drive mode for a known mass flow rate of material and said complex modal transformation is a matrix which transforms said calibrated complex eigenvector to a rotation of said complex eigenvector associated with said drive mode for said unknown mass flow rate of said material, and estimates a process parameter for the material processing system according to the resolved motion.

2. A sensor according to claim 1, wherein said overdetermined process parameter estimator comprises:

means for generating an estimate of motion attributable to a Coriolis force; and means, responsive to an estimate of motion being generated, for generating an estimate of a process parameter from the estimate of motion.

3. A sensor according to claim 2, wherein said means for generating the estimate of a process parameter comprises means for generating an estimate of mass flow.

4. A sensor according to claim 2:
wherein said overdetermined process parameter estimator resolves motion of said conduit to motion in a complex mode; and
wherein said plurality of motion transducers produce the plurality of motion signals wherein each respective one of the motion signals represents motion at a respective spatially distinct location on the conduit in response to the excitation, the number of locations exceeding two such that the plurality of motion signals provides an overdetermined information source for resolution of motion in the complex mode.

5. A sensor according to claim 1, wherein said overdetermined process parameter estimator comprises:
means for combining a group of motion signals to produce a spatially averaged motion signal; and
means, responsive to the spatially averaged motion signal being produced, for generating an estimate of a process parameter from the spatially averaged motion signal.

6. A sensor according to claim 5, wherein said means for generating the estimate of the process parameter comprises means for generating an estimate of mass flow.

7. A sensor according to claim 1:
wherein said overdetermined process parameter estimator resolves motion of said conduit to motion in each of a number of real modes; and
wherein said plurality of motion transducers produces a plurality of motion signals representing motion at a number of locations exceeding the number of real modes such that the plurality of motion signals provides an overdetermined information source for resolution of motion in each of the number of real modes.

8. A sensor according to claim 7, wherein said overdetermined process parameter estimator comprises:
means for generating an estimate of modal motion attributable to a Coriolis force; and
means, responsive to modal attributable motion being estimated, for generating the estimate of the process parameter from the estimate of modal motion.

9. A method of determining a process parameter associated with a material flowing through a conduit configured to contain material at an unknown flow rate from a material processing system, the method comprising the steps of:
exciting the conduit as the material flows through the conduit;
identifying a number of forces associated with the excited conduit;
producing a plurality motion signals from a plurality of motion transducers operatively associated with the conduit, a respective one of the motion signals representing motion at a respective spatially distinct location on the conduit in response to the excitation, the number of locations exceeding the identified number of forces such that the plurality of motion signals represents an overdetermined information source for resolving motion of the conduit into motion attributable to each of the identified number of forces;
generating a complex modal transformation from said plurality of motion signals wherein said complex modal transformation is a transformation of a calibrated complex eigenvector from said plurality of motion signals and wherein said calibrated complex eigenvector is a known rotation of a complex eigenvector associated with a drive mode at a known mass flow rate and said complex modal transformation is a matrix which transforms said calibrated complex eigenvector to a rotation of said complex eigenvector associated with said drive mode for said unknown mass flow rate and
generating an estimate of the process parameter from said complex modal transformation.

10. A method according to claim 9, wherein said step of generating comprises the step of generating the estimate of motion attributable to a force of the identified number of forces.

11. A method according to claim 10, wherein said step of generating the estimate of motion comprises the steps of:
generating an estimate of motion attributable to a Coriolis force; and
generating an estimate of a process parameter from the estimate of motion attributable to the Coriolis force.

12. A method according to claim 11, wherein said step of generating the estimate of the process parameter comprises the step of generating an estimate of mass flow.

13. A method according to claim 9, wherein said step of generating the estimate of the process parameter comprises the steps of:
combining a group of motion signals to produce a spatially averaged motion signal; and
generating an estimate of a process parameter from the spatially averaged motion signal.

14. A method according to claim 13, wherein said step of generating the estimate of the process parameter comprises the step of generating an estimate of mass flow.

15. A method according to claim 9:
wherein said step of identifying the number of forces comprises the step of identifying a number of real modes; and
wherein said step of producing the plurality of motion signals comprises the step of producing a plurality of motion signals representing motion at a number of locations exceeding the number of real modes such that the plurality of motion signals represent an overdetermined information source for resolution of motion of the conduit into motion in each of the plurality of real modes.

16. A method according to claim 15, wherein said step of generating the estimate of the process parameter comprises the steps of:
generating an estimate of modal motion attributable to a Coriolis force; and
generating an estimate of a process parameter from the estimate of modal motion.

17. A method according to claim 9:
wherein said step of identifying the number of forces comprises the step of identifying a complex mode; and
wherein said step of producing the plurality of motion signals comprises the step of producing a plurality of motion signals representing motion at a number of locations exceeding two such that the plurality of motion signals provides an overdetermined information source for resolution of the conduit into motion in the complex mode.

* * * * *

UNITED STATES PATENT AND TRADEMARK OFFICE
CERTIFICATE OF CORRECTION

PATENT NO. : 6,233,526 B1
DATED : May 15, 2001
INVENTOR(S) : Cunningham, Timothy J.

It is certified that error appears in the above-identified patent and that said Letters Patent is hereby corrected as shown below:

Column 1,
Line 5 replace "BACKBROUND OF THE INVENTION" with
-- BACKGROUND OF THE INVENTION --

Column 6,
Line 24 replace "[M]{x}+[C]{x}+[K]{x}={F}  . (3)  with  -- $[M]\{x\}+[C]\{x\}+[K]\{x\}=\{F\}$,  (3)

Column 7,
Line 39
replace  "$[Y_e] = \begin{bmatrix} x_1 & 1 \\ x_2 & 1 \\ \vdots & \vdots \\ x_n & 1 \end{bmatrix} \begin{bmatrix} a \\ b \end{bmatrix}^T = [Z]\{c\}$,  (6)"

with  -- $[Y_e] = \begin{bmatrix} x_1 & 1 \\ x_2 & 1 \\ \vdots & \vdots \\ x_n & 1 \end{bmatrix} \begin{bmatrix} a \\ b \end{bmatrix}^T = [Z]\{c\}$,  (6)

Column 8,
Line 41 replace "FIG. 3 illustrates an exemplary embodiment of overde-" with
-- FIG. 3 illustrates an exemplary embodiment overde-"

Column 9,
Line 58 replace "113B are fed to a signal combining means 423A, 423A," with
-- 113B are fed to a signal combining means 423A, 423B, --

Signed and Sealed this

Twenty-eighth Day of May, 2002

*Attest:*

*Attesting Officer*

JAMES E. ROGAN
*Director of the United States Patent and Trademark Office*